J. A. FREY.
FURNACE FOR TREATING ORES.
APPLICATION FILED AUG. 23, 1913.
1,081,732.
Patented Dec. 16, 1913.
3 SHEETS—SHEET 1.
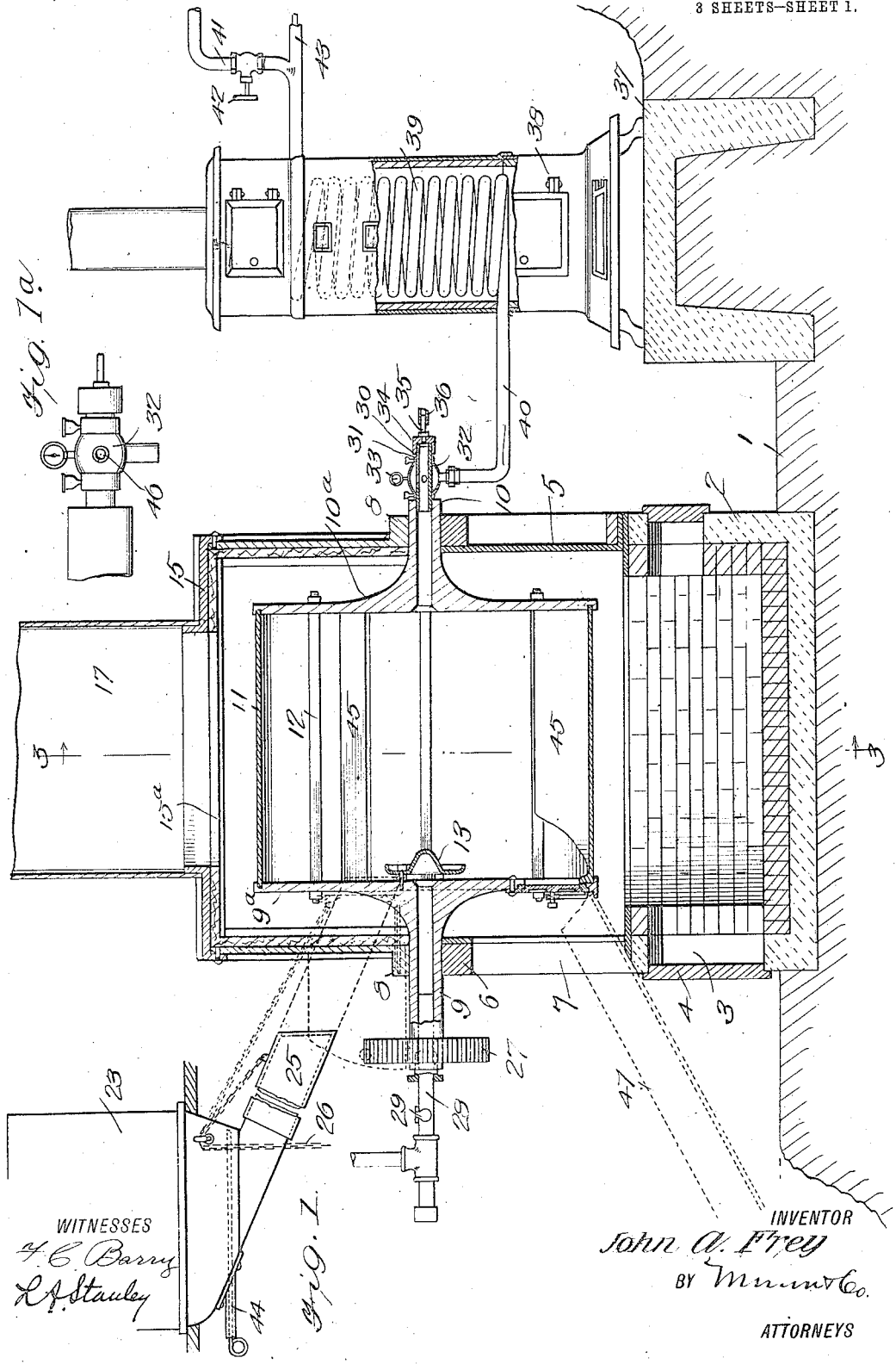
WITNESSES
INVENTOR
John A. Frey
BY
ATTORNEYS J. A. FREY.
FURNACE FOR TREATING ORES.
APPLICATION FILED AUG. 23, 1913.
1,081,732.
Patented Dec. 16, 1913.
3 SHEETS—SHEET 2.
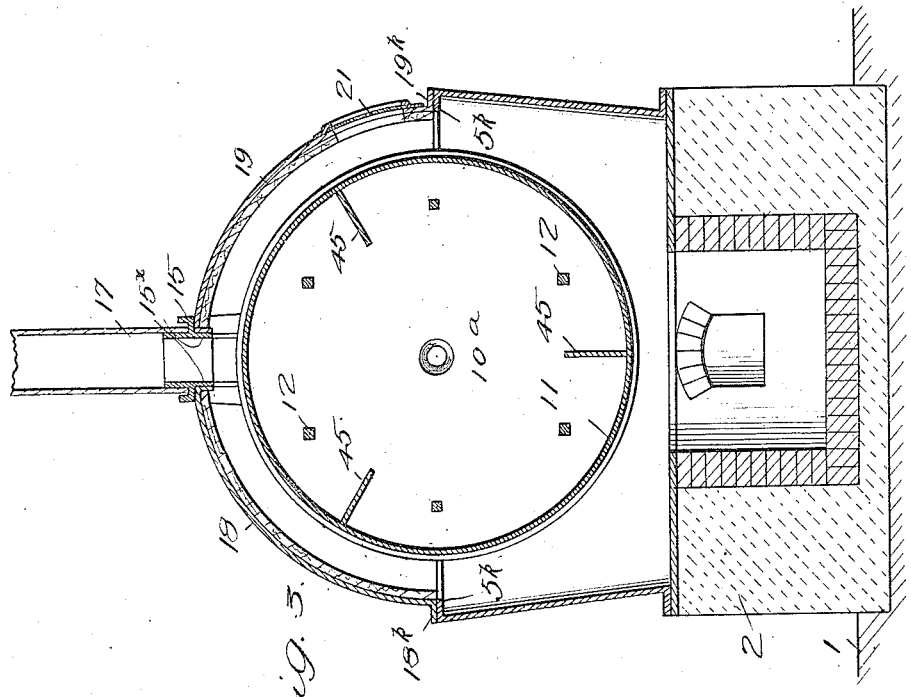
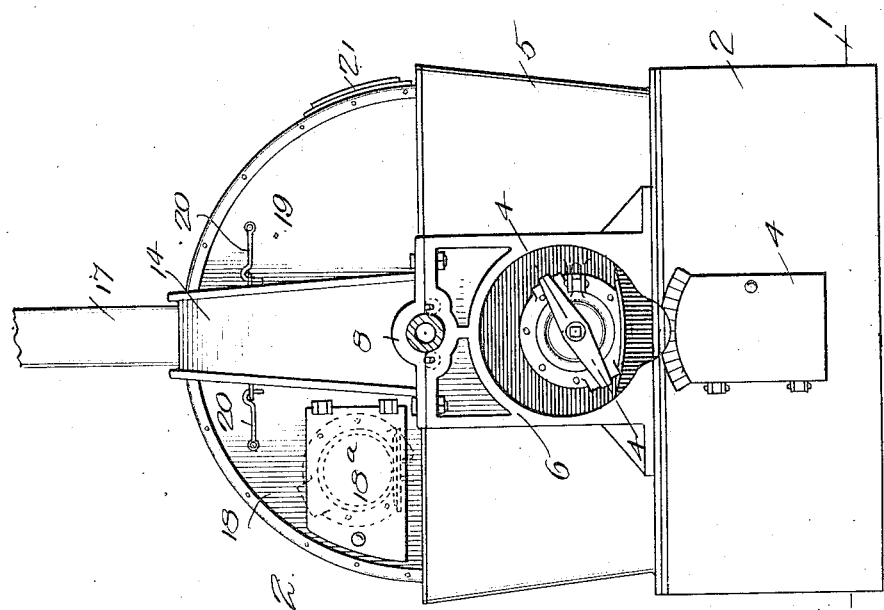
WITNESSES
INVENTOR
John A. Frey
BY
ATTORNEYS J. A. FREY.
FURNACE FOR TREATING ORES.
APPLICATION FILED AUG. 23, 1913.
1,081,732.
Patented Dec. 16, 1913.
3 SHEETS—SHEET 3.
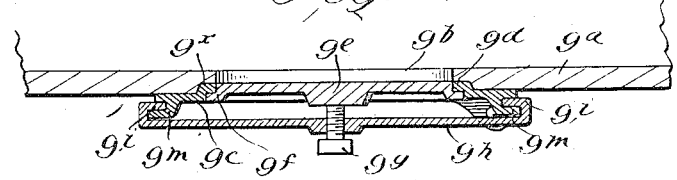
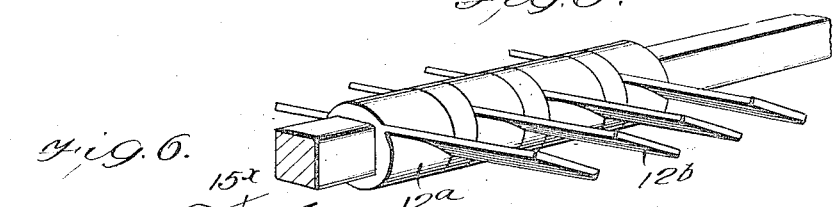
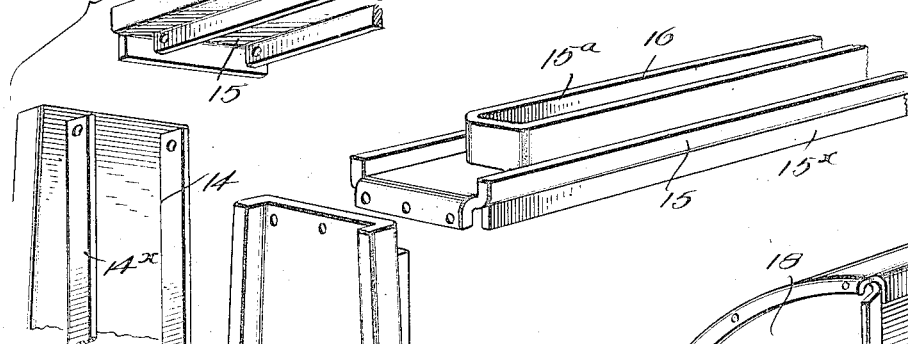
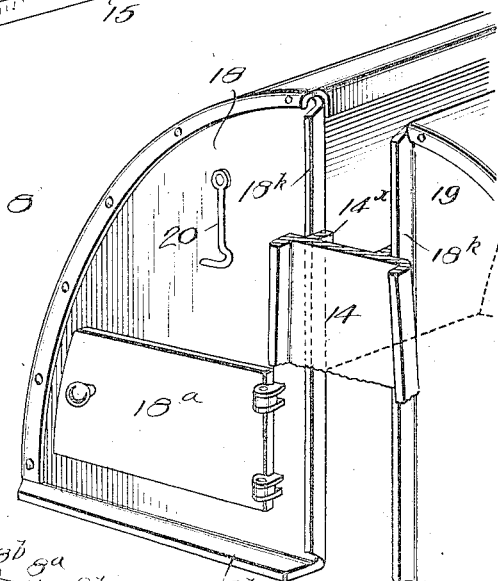
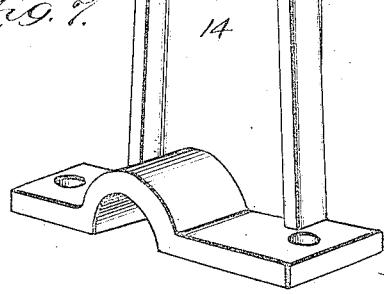
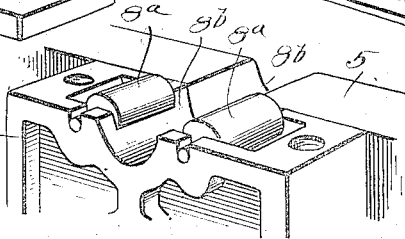
WITNESSES
F. C. Barry
L. A. Stanley
INVENTOR
John A. Frey
BY Munn & Co.
ATTORNEYS

UNITED STATES PATENT OFFICE.

JOHN A. FREY, OF SILVER SPRING, MARYLAND.

FURNACE FOR TREATING ORES.

1,081,732. Specification of Letters Patent. Patented Dec. 16, 1913.

Application filed August 23, 1913. Serial No. 786,284.

*To all whom it may concern:*

Be it known that I, JOHN A. FREY, a citizen of the United States, and a resident of Silver Spring, in the county of Montgomery and State of Maryland, have made certain new and useful Improvements in Furnaces for Treating Ores, of which the following is a specification.

An object of my invention is to provide a device by means of which ores such as those containing sulfur, arsenic, and the like may be treated in order to bring them into a state from which the valuable metals may be readily extracted.

A further object of my invention is to provide a novel form of furnace in which steam is passed into the furnace under high temperature and pressure in order to aid in the treatment of the ores.

A further object of my invention is to provide a novel form of furnace which may be readily assembled or dismantled.

A further object of my invention is to provide a furnace of the type described with novel means for charging and discharging the furnace.

Other objects and advantages will appear in the following specification and the novel features of the device will be particularly pointed out in the appended claims.

My invention is illustrated in the accompanying drawings forming part of this application in which—

Figure 1 is a vertical section through the furnace, Fig. 1$^a$ is a detail face view of a pressure gage, Fig. 2 is an end view of the furnace, Fig. 3 is a section along the line 3—3 of Fig. 1, Fig. 4 is a section along the line 4—4 of Fig. 2, Fig. 5 is a perspective view of a portion of a modified form of the device, Fig. 6 is a detail perspective view of the inner portions of part of the frame work or casing, and Figs. 7, 8, and 9 are detail perspective views of the casing and supporting frame work therefor.

In carrying out my invention I provide a suitable foundation 1 upon which is mounted the base 2 of the furnace. The base contains the combustion chamber 3 to which access is had by means of the door 4.

Above the base portion 2 is a casing portion preferably of rectangular shape and made of metal or other suitable material as shown at 5. Secured at the ends of the member 5 and resting upon the base 2 are the substantially rectangular frames 6, each provided with a central opening 7. At the top of the frames 6 are the bearings 8. The latter, as will be seen from Fig. 9, are provided with anti-friction rollers 8$^a$, which are set in sockets in the frames 6. The frames 6 and the upper end of the member 5 are provided with alined grooves 8$^b$ for receiving the hollow shafts 9 and 10 respectively. These hollow shafts, as will be seen from Fig. 1, form extensions of integral heads 9$^a$ and 10$^a$ respectively. A cylindrical member 11 is secured at its ends to the heads 9$^a$ and 10$^a$, thus forming the main roasting chamber. Longitudinal bars or brace members 12 are secured to the heads and pass through the roasting chamber. Certain of these rods 12 may be provided with sleeves 12$^a$ which fit over the rods and to which are secured a series of blades 12$^b$, these blades being parallel with each other, but the plane of the blades being at an angle to the axis of the rods 12. On the interior of the roasting chamber is a shield or deflector 13 whose purpose will be explained later.

Secured to the tops of the frame member 6 are the uprights 14 to which is secured a central cross member 15 having a central opening 15$^a$ surrounded by a flange or collar 16. The latter forms a retaining member for the stack 17. The members 14 and 15 are braced on their under sides by means of the braces or flanges 14$^x$ and 15$^x$, as shown in Fig. 6. The upper part of the casing consists of two members 18 and 19 which are substantially in the form of quarter cylinders, as will be seen from the drawings. The member 18 is provided with a door 18$^a$ at one end. The bottoms of the members 18 and 19 are provided with outwardly turned flanges 18$^k$ and 19$^k$ respectively arranged to rest upon the inturned flanges 5$^k$ of the member 5. These quarter cylindrical casing members may be secured to the upright frame members 14 by means of hook 20 or in any other suitable manner. As will be seen from Fig. 8 certain of the outwardly turned flanges 18$^k$ and 19$^k$ abut the brace members 14$^x$ of the upright frame members 14, while other flanges abut the brace members 15$^x$ of the upper frame member 15. The upper casing member 19 is provided with an opening which may be closed by a closure 21, and which may be used as a peep hole to view the interior of the device.

The head 9ª of the roasting chamber proper is provided with an opening 9ᵇ (see Fig. 4). Around this opening is a frame 9ᶜ which is countersunk as shown at 9ᵈ and which is provided with a shoulder arranged to receive the closure 9ᵉ. The latter is provided with a rim 9ᶠ arranged to engage the shoulder on the frame. The closure 9ᵉ may be held in place by means of a screw 9ᵍ which passes through a plate or bar 9ʰ. The ends of the latter are bent as shown at 9ⁱ to engage flanges 9ᵐ of the plate 9ᶜ. It will be seen that by turning the screw 9ᵍ the closure 9ᵉ may be held securely in position and that on the release of the screw 9ᵍ the bar 9ʰ may be slipped out of its place, thereby permitting the closure 9ᵉ to be removed.

The crushed or powdered ore is normally held in a bin 23 from which leads a chute 24 having a telescopic extension 25 which may be moved outwardly by means of a chain 26. On one end of the hollow shaft 9 is a driving gear 27. An extension of the shaft 9 is shown at 28. This is provided with a valve 29.

Communicating with the hollow shaft 10 on the opposite end of the device is a pipe 30 having openings 31 leading into a chamber or casing 32. Communicating with the latter is a pressure gage 33. At one end of the pipe 30 is a cap 34 having a swiveled hollow nipple 35 to which a pipe 36 may be attached, the purpose of this arrangement being to permit the attachment of the pipe to the end of the pipe 30 so as to permit the revolution of the latter while the pipe 36 is stationary. Through this pipe 36 I may introduce chemicals under pressure for the purpose of aiding in the treatment of the ores.

Mounted upon a suitable foundation 37 is a heater 38 having inside of it a coil 39 which communicates at one end by means of a pipe 40 with the chamber 32 and at the other end with an inlet pipe 41 which is provided with a valve 42. A branch pipe 43 also communicates with the coil 39 and may be provided with a valve (not shown).

From the foregoing description of the various parts of the device the operation thereof may be readily understood.

The roasting chamber is revolved until the closure 9ᵉ comes opposite the door 18ª. The latter is swung open and the closure is removed in the manner already described and the extension 25 of the pipe 24 is run in as shown by dotted lines in Fig. 1. The finely ground ore is now permitted to pass into the roasting chamber by operating the gate 44. When a sufficient quantity of the ore has been placed within the chamber, the gate is shut off and the telescopic portion of the pipe 25 is withdrawn and the closure 9ᵉ is replaced. The roasting chamber is subjected to a preliminary heating by placing fuel in the combustion chamber 3. It will be understood that this fuel may be either liquid or solid fuel as conditions warrant. Steam is passed in through the pipe 41 by opening the valve 42. The steam is under considerable pressure and is highly heated in the coils 39 by means of the heater 38. These coils are heated to redness in order to raise the steam to high temperature. The steam passes through the pipe 40 and through the pipe 30 and hollow shaft 10 into the interior of the roasting chamber. The latter is turned by power applied to the gear 27 and the ore is caught up by shelves or brackets 45 (see Fig. 3) and deposited again on the bottom, thus permitting the steam to have full access to all parts thereof. The steam tends to increase the temperature within the furnace and by its action greatly facilitates the removal of the sulfur, arsenic, and other constituents of the ores which are designed to be gotten rid of. The shield 13 prevents the blowing of the fine dust particles out through the hollow shaft 9, thus eliminating danger of clogging up the latter, but it will permit the gases containing the deleterious substances such as compounds of sulfur and arsenic to pass through the hollow shaft 9. When the pressure rises sufficiently the valve 29 opens and permits the escape of these gases whence they may be subsequently treated for recovery of the sulfur or arsenic. The latter step however forms no part of this invention. An automatic valve (not shown) may be secured to the chamber 32 at 46 (see Fig. 4), so as to prevent an excess of pressure within the roasting chamber. When the ores have been sufficiently treated the roasting chamber is brought into the position shown in Fig. 1, the closure 9ᵉ is removed and the contents of the roasting chamber may be withdrawn through the chute 47 shown in dotted lines.

The device described above forms a very efficient means of treatment of the ores. The provision of means for heating the steam tends to bring the latter into condition for most effective treatment of the ores. The charging of the device and the emptying of the latter takes but little time, while the closure 9ᵉ is held securely when once the chamber is charged. The outer casing is very easily removed for purposes of repair or inspection by unloosening the hooks 20 and sliding the quarter cylindrical casing members 18 and 19 outwardly. The provision of the roller bearings 8ª reduces the friction while rotating the chamber and adds to the economical working of the device.

It may be sometimes desirable to introduce hydrocarbon compounds with the steam in order to increase the temperature within the roasting chamber and to this end I provide the pipe 43 which, as stated above, communicates with the coil 39.

I claim:

1. In a device for treating ores, a roasting chamber comprising a cylindrical casing, heads at the end of said casing, a hollow shaft on one side of each of said heads and forming an integral portion thereof, an exterior casing for said roasting chamber, said shafts being journaled in said exterior casing, means for introducing steam through one of said hollow shafts, means for permitting the escape of the gaseous products through the other of said shafts, and a deflector carried by one of said heads and disposed over the end of the exhaust passage, said deflector being spaced from the head to permit the passage of the gaseous products.

2. In a furnace for treating ores, a roasting chamber, a casing therefor, said casing comprising a base portion having bearings, hollow shafts communicating with the interior of said roasting chamber and being journaled on said bearings, and an upper portion comprising two separable quarter cylindrical casing members, and means for securing said casing members together.

3. In a furnace for roasting ores, a base portion provided with bearings, hollow shafts journaled in said bearings, a head integral with each of said shafts, a cylindrical member secured to said head, said heads and said cylindrical member forming a roasting chamber, a casing frame mounted upon said base portion, said frame comprising end members and a longitudinal top member, quarter cylindrical casing members disposed on each side of said frame members, and means for securing said casing members to said frame members.

4. In a furnace for treating ores, a roasting chamber, a casing therefor, said casing comprising a base portion having bearings, hollow shafts journaled in said bearings and communicating with the interior of said roasting chamber, an inverted U-shaped frame member secured to said base and being provided with a central opening, a stack supported by said inverted U-shaped frame member and communicating with said central opening, and quarter-cylindrical casing members slidably disposed upon said base and movable toward and away from said inverted U-shaped frame member.

5. In a furnace for treating ores, a roasting chamber, a casing therefor, said casing comprising a base portion, an inverted U-shaped frame secured to said base portion, said frame being provided with inwardly projecting flanges, quarter-cylindrical casing members disposed upon said base and being provided with flanges arranged to abut the inwardly projecting flanges of said inverted U-shaped frame member, and means for securing said quarter-cylindrical casing to said inverted U-shaped frame member.

JOHN A. FREY.

Witnesses:
L. A. STANLEY,
SOLON C. KEMON.